United States Patent Office 2,885,249
Patented May 5, 1959

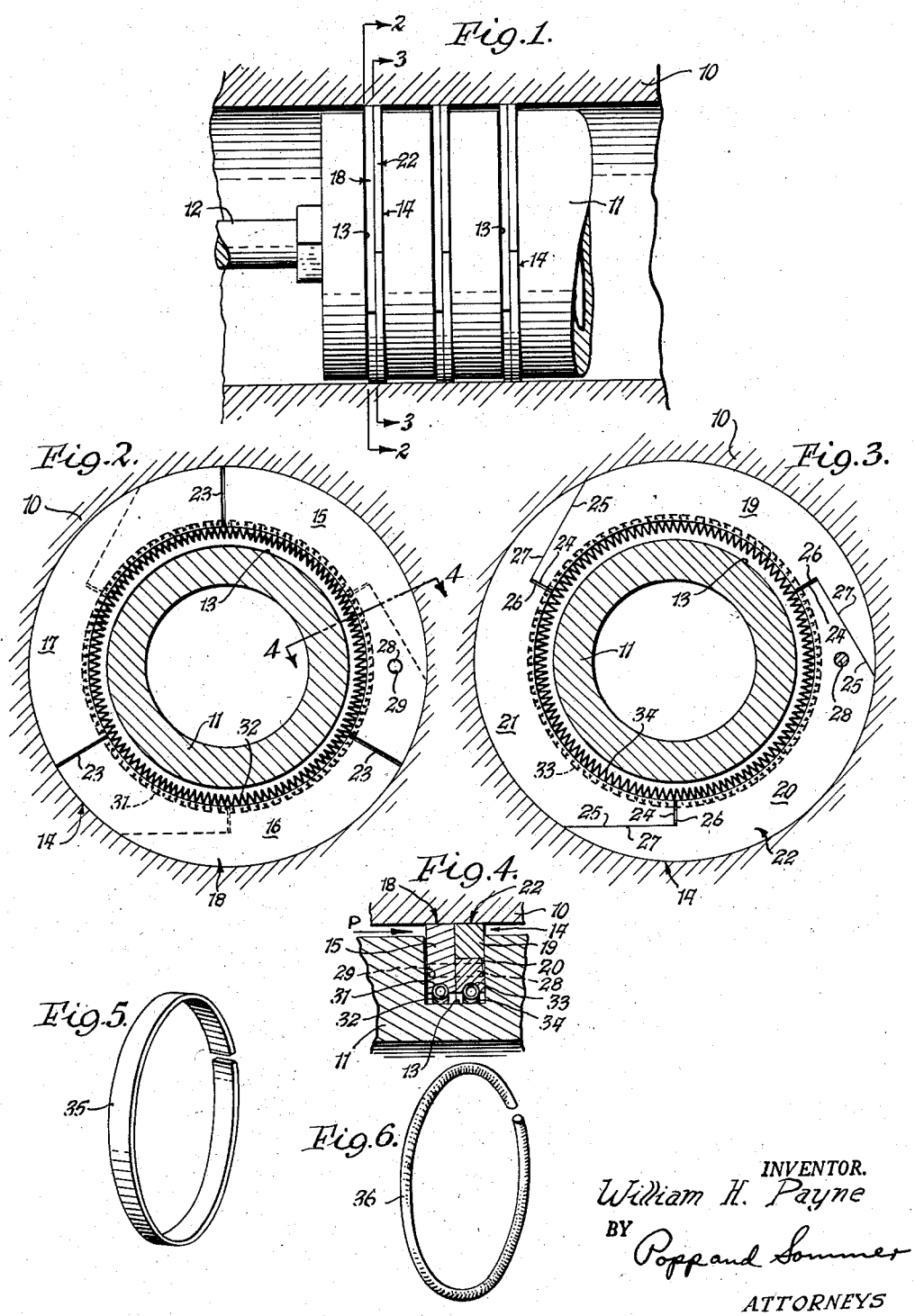

2,885,249

HIGH PRESSURE PISTON RING ASSEMBLY

William H. Payne, Olean, N.Y., assignor to Dresser Operations, Inc., Whittier, Calif., a corporation of California Application April 28, 1958, Serial No. 731,257

3 Claims. (Cl. 309—29)

This invention relates to a piston ring assembly, and more particularly to a piston ring assembly which may be mounted on a piston having sliding movement in a cylinder in which a fluid under extremely high pressure is confined, say a pressure in the order of 36,000 pounds per square inch.

The problem of obtaining a piston reciprocably movable in a cylinder confining a fluid under such high pressure presents special problems. The piston ring assembly embodying the present invention represents a very satisfactory solution to such problems.

The principal object of the present invention is to provide a piston ring assembly which is capable of effectively sealing the sliding joint between a piston and cylinder against the loss of fluid under extremely high pressure on one side of the piston.

Another object of the invention is to provide such a piston ring assembly which has a long life compared to other known and less satisfactory piston ring assemblies intended for use particularly with high pressures.

A further object is to provide such a piston ring assembly which utilizes the high pressure of the fluid to increase the sealing effect of the assembly.

Other objects and advantages of the present invention will be apparent from the following detailed description and accompanying drawings in which:

Fig. 1 is a longitudinal sectional view through a cylinder having a reciprocable piston therein and showing a plurality of piston ring assemblies embodying the principles of the present invention mounted on the piston.

Fig. 2 is an enlarged vertical transverse sectional view thereof, taken on line 2—2 of Fig. 1.

Fig. 3 is a similar enlarged vertical transverse sectional view thereof, taken on line 3—3 of Fig. 1.

Fig. 4 is a fragmentary cross-sectional view of the piston ring assembly and the associated cylinder and piston members, this view being taken on line 4—4 of Fig. 2.

Fig. 5 is a perspective view of a modified spring member constituting one element of the new piston ring assembly.

Fig. 6 is a perspective view of a further modified form of spring member.

The numeral 10 represents a cylinder in which a piston 11 of slightly smaller diameter is reciprocably slidable, such piston being shown as mounted on one end of a piston rod 12. The periphery of the piston 11 is provided with one or more axially spaced annular grooves 13 each of which is adapted to receive a piston ring assembly indicated generally at 14 and embodying the principles of the present invention. In Fig. 1, the piston illustrated is shown as having three such grooves 13 and piston ring assemblies 14. It will be necessary only to describe one piston ring assembly.

The piston ring assembly 14 comprises a first series of flat and parallel sided segments 15, 16 and 17 arranged end to end to form a first ring 18 as shown in Fig. 1. A second series of flat and parallel sided segments 19, 20 and 21 are arranged end to end to form a second ring 22 shown in Fig. 1. Each ring is shown as including three segments although any larger number of segments may be employed in each ring. It is preferred to provide the same number of segments in each ring.

Each of the segments is shown as having a curved outer periphery adapted to engage the cylinder wall 10. The opposite or inner side of each segment is also curved and parallel to the outer periphery. The segments in each ring are of the same width; thus the segments are of arcuate shape having flat radial sides lying respectively in common radial planes.

The rings 18 and 22 are disposed side by side so that the opposing flat and radial side surfaces of the two rings contact each other. The circumferential ends of the segments 15, 16 and 17 in the ring 18 terminate in flat radial surfaces, opposing pairs of which provide a radial joint 23.

Considering the other ring 22, the corresponding end of each of the segments 19, 20 and 21 has a radial end surface 24 extending outwardly from the inner periphery of the segment partway toward the outer periphery of the ring. The same end of each of these segments has a flat surface 25 which intersects the outer periphery of the segment at an angle to the tangent thereof and also intersects the flat radial end surface 24 at a substantially right angle. The opposing end of the adjacent segment in the same ring is provided with a radial end surface 26, opposing, parallel and slightly spaced from the end surface 24 on the adjacent segment. The outer end of this end surface 26 is connected by a flat surface 27 leading to the periphery of the segment at right angle to the surface 26.

The surfaces 25, 27 of adjacent segments in the ring 22 are flat, parallel and overlap and contact each other. The corresponding opposing end surfaces 24, 26 and 25, 27 provide a right angle joint one end of which leads to the inner periphery of the ring 22 and the other to the outer periphery thereof. It will be seen that if the ring 22 is urged to enlarge its circumference, the surfaces 24, 26 in each joint will tend to separate but the surfaces 25, 27 of each joint remains in contact, these two surfaces sliding one over the other to permit of such enlargement of the ring.

It is important that the body portion of a segment in one ring close or cover the joint between adjacent segments in the other ring. Referring to Fig. 2, it will be seen that the two rings are oriented so that the right angle joints in the ring 22 are intermediate the radial joints 23 in the ring 18.

Means are provided for maintaining this circumferential orientation of the rings and to prevent relative shift. For this purpose one of the segments in the ring 22, specifically the segment 20 is shown as having an axially extending pin projecting toward the segment 15 in the other ring 18 and received in a hole 29 provided therein.

Independent spring means are provided for each ring on the inside thereof and are arranged to enlarge the circumference thereof by urging the segments therein outwardly. For this purpose each of the segments 15, 16, 17 in the ring 18 is shown as being provided centrally on the inner side thereof with a semi-cylindrical recess extending from end to end. Such recesses collectively provide a continuously annular groove 31 in which is arranged a continuous helical spring 32. The spring 32 is of annular form and so constructed that when arranged in the groove 31 it tends to expand and thereby urge the segments 15, 16 and 17 radially outwardly so as to tend to increase the gaps of the joints 23.

Each of the segments 19, 20, 21 of the other ring 22 is similarly provided with an inside recess which jointly provide a continuous semi-cylindrical annular groove 33 in which a helical spring 34 of annular form, similar to the spring 32, is arranged whereby the segments 19, 20 and 21 are urged to move radially outwardly. In doing so the contracting and overlapping surfaces 25, 27 of adjacent pairs of segments have sliding contact one on the other.

Instead of the contiuous annular helical expansion spring 32 or 34, a split annular flat sided band spring 35 such as shown in Fig. 5 may be employed. With such a spring, the grooves 31 and 33 would be preferably flat sided in order to accommodate the spring 35. Still another type of spring such as shown at 36 in Fig. 6 may be employed. The spring 36 is in the form of a split annular wire or rod. One such spring could be arranged in each of the grooves 31 and 33 without change in configuration of such grooves.

Each piston ring assembly 14 is arranged on the piston so that the ring 18 faces the high pressure represented by the arrow P in Fig. 4. The piston ring assembly is arranged in its groove 13 in the piston 11 and which groove is sufficiently deep to provide a clearance between the springs 32, 34 and the bottom of the groove 13. The total width of the two contiguous rings 18, 22 is slightly less than the spacing between the opposing flat and radial side walls of the groove 13.

Referring to Fig. 4, it will be seen that the high pressure forces the ring assembly against the right hand side wall of the groove 13 so that the outer radial side surfaces of the segments 19, 20, 21 intimately engage this groove surface. It will also be noted that the right hand side wall of the groove 13 covers the spreadable radial joint portions provided between the opposing segment end surfaces 24 and 26 between the segments in the ring 22. Likewise the flat inner radial side surfaces of the segments 15, 16 and 17 are forced into intimate contact with the opposing flat radial side surfaces of the segments in the ring 22. The radial joints 23 between the opposing ends of the segments in the ring 18 are covered by the intermediate body portions of the segments in the other ring 22.

It will also be noted that the high pressure is conducted through the slight spacing between the left hand side of the segments in the ring 18 and the left hand side wall of the groove 13 to the space at the bottom of the piston ring assembly so that this high pressure is applied to the inside surface of the ring assembly. This is effective in supplementing the action of the springs 32, 34 in forcing the rings 18, 22 radially outwardly so that the peripheries of these rings are forced into intimate contact with the cylinder wall 10 where the sealing to prevent the escape of the high pressure must be effective.

It is important to note that each ring, 18 or 22, is independently urged to move outwardly by its internal spring means. This has the advantage that if the peripheral surfaces of the segments in the rings 18 and 22 wear at different rates, the segments in each ring will be self adjusting so as to maintain the same degree of contact with the cylinder wall 10.

A piston ring assembly constructed as shown in the drawing and described above has been found to be highly effective in sealing against high pressures and has also been outstanding in its longevity as compared with other known piston ring assemblies intended for high pressure application. Long life of the piston ring assembly reduces down time of the machine for repair or replacement of the piston ring assemblies.

I claim:

1. A piston ring assembly, comprising a first series of segments arranged end to end to form a first ring, a second series of segments arranged end to end to form a second ring disposed side by side to said first ring with the segments in one ring contacting those in the other ring, the opposing ends of the segments in one ring having contacting, overlapping, flat and parallel surfaces extending inwardly from the periphery of such ring and lying in a plane normal to the radius of such ring, the opposing ends of the segments in the other ring lying in a radial plane, the segments in both rings being so arranged that the joints between the opposing ends of the segments in each ring are covered by the segments in the other ring, and independent annular spring means for each ring on the inside thereof and arranged to enlarge the circumference thereof by urging the segments therein outwardly.

2. A piston ring assembly, comprising a first series of segments arranged end to end to form a first ring, a second series of segments arranged end to end to form a second ring disposed side by side to said first ring with the segments in one ring contacting those in the other ring, the opposing ends of the segments in one ring having contacting surfaces overlapping each other in a circumferential direction, the segments in both rings being so arranged that the joints between the opposing ends of the segments in each ring are covered by the segments in the other ring, each of the segments in both rings being recessed on the inner side thereof from end to end to provide collectively a continuous annular groove for each ring, and independent annular spring means arranged in the groove of each ring to enlarge the circumference thereof by urging the segments therein outwardly.

3. A piston ring assembly, comprising a first series of flat and parallel sided segments arranged end to end to form a first ring, a second series of flat and parallel sided segments arranged end to end to form a second ring disposed side by side to said first ring with the segments in one ring contacting those in the other ring, each of said series having the same number of segments, the opposing ends of the segments in one ring having contacting, overlapping flat and parallel surfaces extending inwardly from the periphery of such ring and lying in a plane normal to the radius of such ring, the opposing ends of the segments in the other ring lying in a radial plane, the segments in both rings being so arranged that the joints between the opposing ends of the segments in each ring are covered by the segments in the other ring, a pin extending axially from a segment in one ring and projecting into a recess provided in a segment in the other ring to prevent relative shift between the rings in a circumferential direction, each of the segments in both rings being recessed on the inner side thereof from end to end to provide collectively a continuous annular groove for each ring, and independent annular spring means arranged in the groove of each ring to enlarge the circumference thereof by urging the segments therein outwardly.

References Cited in the file of this patent

UNITED STATES PATENTS

| | | |
|---|---|---|
| 1,344,342 | Hanson | June 22, 1920 |
| 1,574,926 | Norton | Mar. 2, 1926 |
| 2,333,690 | Smith | Nov. 9, 1943 |